(12) United States Patent
Eike et al.

(10) Patent No.: US 8,991,798 B2
(45) Date of Patent: Mar. 31, 2015

(54) PNEUMATIC SPRING STRUT HAVING A RESILIENT PISTON BEARING

(75) Inventors: Thomas Eike, Hannover (DE); Jens Uwe Gleu, Langenhagen (DE); Andreas Nessel, Isernhagen (DE); Dirk Rosner, Garbsen (DE); Holger Oldenettel, Wedemark (DE)

(73) Assignee: Continental Teves AG & Co. oHG (DE)

( * ) Notice: Subject to any disclaimer, the term of this patent is extended or adjusted under 35 U.S.C. 154(b) by 74 days.

(21) Appl. No.: 13/816,609

(22) PCT Filed: Jun. 1, 2011

(86) PCT No.: PCT/EP2011/059123
§ 371 (c)(1),
(2), (4) Date: Feb. 12, 2013

(87) PCT Pub. No.: WO2012/022509
PCT Pub. Date: Feb. 23, 2012

(65) Prior Publication Data
US 2013/0147099 A1   Jun. 13, 2013

(30) Foreign Application Priority Data
Aug. 20, 2010   (DE) .......................... 10 2010 037 096

(51) Int. Cl.
*F16F 9/04* (2006.01)
*F16F 9/02* (2006.01)
(Continued)

(52) U.S. Cl.
CPC .............. *F16F 9/0227* (2013.01); *B60G 15/14* (2013.01); *B60G 2202/314* (2013.01);
(Continued)

(58) Field of Classification Search
CPC .......................... F16F 9/057; B60G 2204/1262
USPC ...................... 267/64.19, 64.21, 64.23, 64.27
See application file for complete search history.

(56) References Cited

U.S. PATENT DOCUMENTS 2,980,441 A * 4/1961 Timpner et al. ......... 280/124.141
4,206,907 A * 6/1980 Harrod ........................ 267/64.24
(Continued)

FOREIGN PATENT DOCUMENTS

DE   195 08 980 C1   6/1996
DE   199 08 607 A1   9/2000
(Continued)

OTHER PUBLICATIONS

International Search Report for PCT/EP2011/059123 mailed Jul. 22, 2011.

*Primary Examiner* — Thomas Irvin
(74) *Attorney, Agent, or Firm* — RatnerPrestia

(57) ABSTRACT

A pneumatic spring strut for a vehicle, having a working chamber which is at least partially enclosed by a pneumatic spring bellows and having a centrally arranged telescopic damper, wherein the pneumatic spring bellows is fastened to the pneumatic spring cover and to a pneumatic spring piston connected to the damper cylinder and can roll on the outer side of the pneumatic spring piston, wherein the pneumatic spring piston is connected, at its top end and above the roll fold, to the damper cylinder by an elastic bearing, and the elastic bearing is composed of an elastomer body which is provided between a collar, which is situated on the damper cylinder, and a flange, which is arranged on the pneumatic spring piston, wherein the collar situated on the damper cylinder is arranged below the piston-rod-side end of the damper cylinder.

10 Claims, 2 Drawing Sheets

(51) Int. Cl.
 *B60G 15/14* (2006.01)
 *F16F 9/05* (2006.01)

(52) U.S. Cl.
 CPC .... *B60G 2204/1262* (2013.01); *B60G 2204/41* (2013.01); *B60G 2206/424* (2013.01); *B60G 2206/73* (2013.01); *F16F 9/057* (2013.01)
 USPC .................................... 267/64.24; 267/64.27

(56) References Cited

U.S. PATENT DOCUMENTS

| | | | | |
|---|---|---|---|---|
| 4,555,096 | A | * | 11/1985 | Pryor ........................ 267/64.21 |
| 4,655,438 | A | * | 4/1987 | Cameron ........................ 267/220 |
| 4,712,776 | A | * | 12/1987 | Geno et al. ................ 267/64.21 |
| 4,802,657 | A | * | 2/1989 | Wijnhoven et al. ........ 267/64.24 |
| 4,989,844 | A | * | 2/1991 | Wijnhoven et al. ........ 267/64.24 |
| 5,009,401 | A | * | 4/1991 | Weitzenhof ................ 267/64.21 |
| 5,135,203 | A | * | 8/1992 | Wijnhoven et al. ........ 267/64.21 |
| 5,667,203 | A | * | 9/1997 | Romer ........................ 267/64.23 |
| 6,116,584 | A | * | 9/2000 | Romer ........................ 267/64.24 |
| 6,443,436 | B1 | | 9/2002 | Schel |
| 6,742,775 | B2 | * | 6/2004 | Oldenettel ................ 267/64.21 |
| 6,827,342 | B2 | * | 12/2004 | Klitsch et al. ............ 267/64.23 |
| 6,910,682 | B2 | * | 6/2005 | Fritz ........................ 267/64.25 |
| 6,962,330 | B2 | * | 11/2005 | Klitsch et al. ................ 267/122 |
| 8,517,357 | B2 | * | 8/2013 | Chapman ................ 267/64.24 |
| 2002/0130452 | A1 | * | 9/2002 | Behmenburg et al. ..... 267/64.23 |
| 2003/0020218 | A1 | * | 1/2003 | Oldenettel ................ 267/64.24 |
| 2004/0026836 | A1 | * | 2/2004 | Brookes ................ 267/64.23 |
| 2004/0222576 | A1 | * | 11/2004 | Oldenettel ................ 267/64.19 |
| 2011/0140323 | A1 | * | 6/2011 | Kwon ........................ 267/64.24 |

FOREIGN PATENT DOCUMENTS

DE         100 09 912 C1      9/2001
DE    10 2004 020 797 A1    11/2005

* cited by examiner

PNEUMATIC SPRING STRUT HAVING A RESILIENT PISTON BEARING

CROSS REFERENCE TO RELATED APPLICATIONS

This application is the U.S. National Phase Application of PCT/EP2011/059123, filed Jun. 1, 2011, which claims priority to German Patent Application No. 10 2010 037 096.7, filed Aug. 20, 2010, the contents of such applications being incorporated by reference herein.

FIELD OF THE INVENTION

The invention relates to a pneumatic spring strut for a vehicle, having a working chamber which is at least partially enclosed by a pneumatic spring bellows composed of elastomeric material and having a telescopic damper which is arranged centrally and at least partially within the working chamber, said damper comprising a housing, which is formed as a damper cylinder and which has a damping piston situated at the inside, and comprising a piston rod which is connected to the damping piston, wherein the pneumatic spring bellows is fastened at one end thereof to the pneumatic spring cover and is fastened at the other end thereof, so as to form a roll fold, to a pneumatic spring piston connected to the damper cylinder and can roll on the outer side of said pneumatic spring piston.

The pneumatic spring cover and the piston rod on the one hand are conventionally connected via a common fastening system to the body, whereas the damper cylinder on the other hand is connected to the running gear, that is to say to the unsprung mass.

BACKGROUND

Nowadays, spring struts with pneumatic springs serve, in particular in passenger motor vehicles, as particularly comfortable suspension elements and ensure a pleasant driving feel in the case of a suspension arrangement which, depending on road conditions, can be adapted between "soft" and "hard" suspension characteristics. Here, a pneumatic spring system or ride-height control system is composed of the pneumatic spring struts, which comprise the pneumatic spring and damper units, for each wheel or at least for each axle, of the air supply system having a compressor, an accumulator and a regenerable dryer, and of further switchable or fixedly set pneumatic control elements, and for this purpose generally has an electronic controller.

The pneumatic spring struts in the prior art are, as is known, sensitive with respect to movements or deflections caused by transverse forces, that is to say by running gear forces normal to the axis of the pneumatic springs.

In particular in the case of relatively long pneumatic spring struts, acting transverse forces lead to a very slight but nevertheless measurable buckling movement wherein the shock-absorbing damper and rolling piston or rolling bellows are pivoted relative to one another. Here, if no precautions are implemented for compensating for such buckling movements, or if no corresponding guides are provided, such movements and forces can lead, within the components of the pneumatic spring strut, to increased frictional contact and thus increased wear. The design of the pneumatic spring struts must therefore be configured so that such movements can be compensated without transverse forces in the spring strut generating frictional wear on the components of the spring strut.

Solutions have already been disclosed in this regard in the prior art, for example by DE 195 08 980 C1, which is incorporated by reference. In the pneumatic spring strut presented therein, the housing, that is to say the damper cylinder of the shock-absorbing damper, has a collar which is welded thereto and to which the rolling piston, which is provided with a corresponding flange, is connected by means of an integrally vulcanized annular part composed of elastomeric material. The elastic ring permits a certain tumbling movement of the pneumatic spring piston relative to the damper cylinder, but without reducing to the desired extent the risk of increased frictional wear from buckling movements.

DE 199 08 607 B4, which is incorporated by reference, discloses a pneumatic suspension strut of the generic type in which the pneumatic spring cover has a concentric inner guide sleeve which interacts with a guide ring arranged on the bellows-side end of the pneumatic spring piston in order to support transverse forces. Here, however, the reduction or the absorption of buckling movements comes at the expense of an increased number of components.

As an additional effect, in the generic pneumatic spring struts in the prior art, the action of transverse forces leads, depending on dimensions and masses of the system, to vibrations and natural frequencies which are not only perceived as acoustically disturbing but can also adversely affect driving comfort.

SUMMARY

An aspect of the invention provides a pneumatic spring strut which can accommodate even transverse forces without problems and thus has wheel-controlling characteristics, which can be produced inexpensively as a result of a simple design, and which reduces the transmission of vibrations or natural frequencies generated by the action of transverse forces, and the transmission of rolling noises, into the vehicle interior.

This is achieved by means of a pneumatic spring strut for a vehicle, having a working chamber which is at least partially enclosed by a pneumatic spring bellows composed of elastomeric material and having a telescopic damper which is arranged centrally and at least partially within the working chamber, said damper comprising a housing, which is formed as a damper cylinder and which has a damping piston situated at the inside, and comprising a piston rod which is connected to the damping piston, wherein the pneumatic spring bellows is fastened at one end thereof to the pneumatic spring cover and is fastened at the other end thereof, so as to form a roll fold, to a pneumatic spring piston connected to the damper cylinder and can roll on the outer side of said pneumatic spring piston, wherein i) the pneumatic spring piston is connected, at its top end and above the roll fold, to the damper cylinder by an elastic bearing, ii) the elastic bearing is composed of an elastomer body which is provided between an axially outwardly projecting collar, which is situated on the damper cylinder, and an axially inwardly projecting flange), which is arranged on the pneumatic spring piston, and iii) the collar situated on the damper cylinder is arranged below the piston-rod-side end of the damper cylinder.

Here, the pneumatic spring piston is connected, at its top end and above the roll fold, to the damper cylinder by means of an elastic bearing. The elastic bearing is composed of an elastomer body which is provided between an axially outwardly projecting collar, which is situated on the damper cylinder, and an axially inwardly projecting flange, which is arranged on the pneumatic spring piston. Furthermore, the collar situated on the damper cylinder is arranged below the piston-rod-side end of the damper cylinder.

By means of such a functional and geometric design of the connection of the damper cylinder and pneumatic spring piston, in particular as a result of the fact that the elastic element is arranged in the upper region of the piston—in particular above the roll fold—the center of rotation about which the piston can tilt is displaced above the action point of the pneumatic spring force, that is to say above the action point of the forces which act on the pneumatic spring piston and which result from the pressure in the working chamber. As a result, owing to the small resulting lever arm between the center of rotation and the action point of the pneumatic spring force, an arrangement is obtained which, under all operating conditions and even for compact pistons, is stable with respect to buckling, that is to say permits buckling movements only in an acceptable range. In the structural implementation provided here, the piston is lengthened in the upper region and is supported in said region on the rubber bearing, but is connected to the damper cylinder entirely below the piston-rod-side end of said damper cylinder. In this way, it is possible to also utilize the advantages of the elastic bearing arrangement for acoustic insulation, without it being necessary to forego the compact design of the piston.

One advantageous refinement consists in that the collar situated on the damper cylinder is welded to or pressed in an air-tight manner onto the damper cylinder. Such simple production and connection methods are very inexpensive and are readily sufficient here. The flange arranged on the pneumatic spring piston can be produced easily by being produced integrally by flanging or produced integrally by rolling.

A further advantageous embodiment consists in that the elastomer body is formed as a substantially annular hollow conical portion, and the abutting flange and collar surfaces are of a form complementary thereto. This results in an equally reliable transmission of force in the axial and radial directions of the pneumatic spring strut/damper, such that two functions can thus be realized in one bearing component.

A further embodiment which is advantageous because it is very simple with regard to material consists in that the elastomer body is composed of rubber. Rubber elements can furthermore be set as desired in terms of their strength and spring characteristics by means of different mixtures and through the addition of reinforcement layers or fibers composed of the different materials.

A further advantageous embodiment consists in that the elastomer body is connected to the flange and/or to the collar by vulcanization. This results in a very simple and extremely secure connection between the collar and flange parts, which are composed of metal or plastic, and a rubber body/elastomer body.

A further advantageous embodiment consists in that the elastomer body is connected to the flange and/or to the collar by means of a positively locking tongue-and-groove connection. This may serve either as an additional fastening measure or as the only fastening measure. It is thus possible, for example, for the rubber bearing to be produced as a separate part and then assembled with the rolling piston and damper, that is to say the flange and the collar. By means of undercuts in the rolling piston or flange or on the damper cylinder or collar, the rubber bearing can for example be clipped in, so as to provide a transport locking facility and/or a facility for securing against removal.

A further advantageous embodiment consists in that the pneumatic spring strut, at its lower end, is supported on the damper cylinder by a further elastomer body. It is thus possible, depending on force action points, to also realize a direct absorption of transverse forces or for example a suitable distribution, with regard to the accommodation of components of the axial and transverse forces acting on the pneumatic spring strut, between the upper connection and lower support. This may be important for example for the accommodation of steering forces.

A further advantageous embodiment consists in that a seal is arranged in the region of the connection, formed at the top end of the pneumatic spring piston, between the pneumatic spring piston and the damper cylinder. It is thus possible for the sealing between the rolling piston and damper cylinder to also be performed by the rubber bearing itself, wherein for example annularly encircling edges are applied to the surface of the rolling piston/flange or damper cylinder/collar or to the elastomer body.

A further embodiment which is advantageous in the same way consists in that a seal is arranged in the region of the further elastomer body at the lower end of the pneumatic spring piston. In such an embodiment, it is also possible to realize a suitable distribution, with regard to the accommodation of forces and the provision of the sealing function, between the upper connection and lower support.

A further advantageous embodiment consists in that the elastomer body arranged between the collar of the damper cylinder and the flange of the pneumatic spring piston is in the form of a segmented ring. For example, three segments arranged at angular intervals of 120°, that is to say three actually "individual" elastomer bodies which are if appropriate connected to one another via an annular flange and which are in the form of hollow conical sections, may be sufficient for absorbing transverse and longitudinal forces in vehicles of relatively low weight. The desired functions are thus provided even with the most lightweight design.

BRIEF DESCRIPTION OF THE FIGURES

The invention will be explained in more detail on the basis of an exemplary embodiment. In the figures.

DETAILED DESCRIPTION OF THE INVENTION

Figure 1:
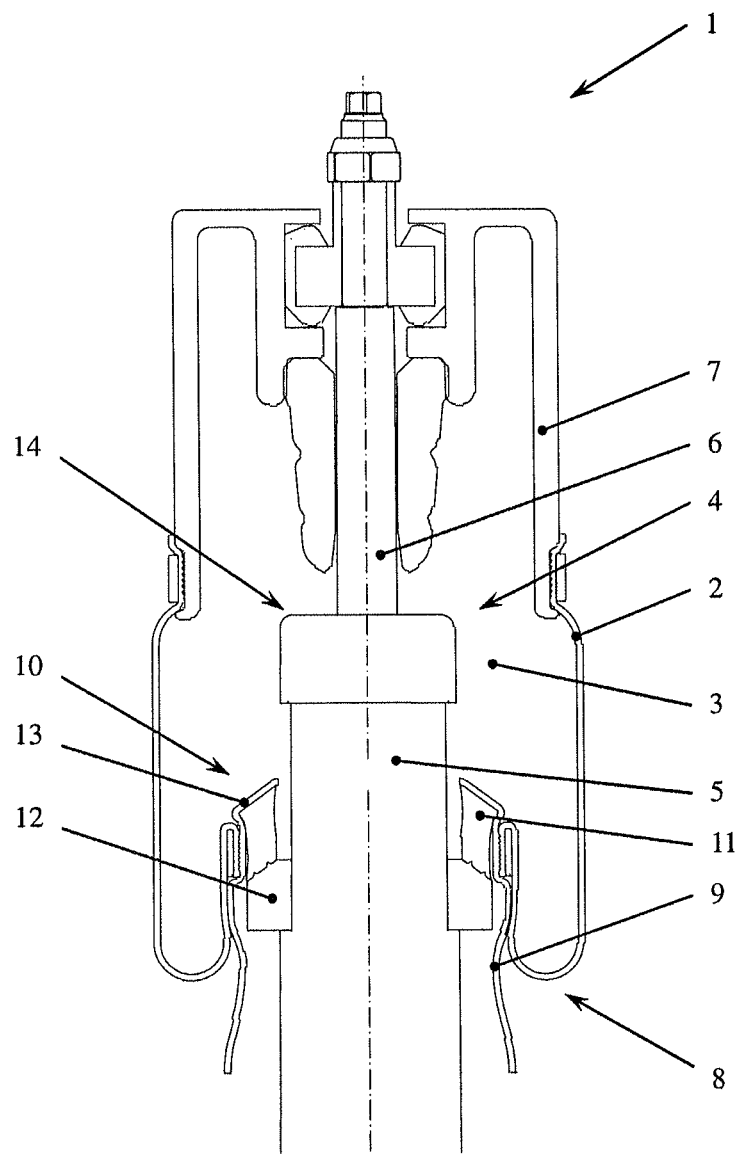
FIG. 1 shows a pneumatic spring strut according to the invention for a passenger motor vehicle.

FIG. 1 shows a pneumatic spring strut 1 for a passenger motor vehicle. The pneumatic spring strut 2 is composed of rubber reinforced with reinforcement members and encloses the working chamber 3. Likewise arranged centrally within the working chamber is the telescopic damper 4, said damper comprising a housing, which is formed as a damper cylinder 5 and which has a damping piston (not illustrated in any more detail here) situated at the inside, and comprising a piston rod 6 which is connected to the damping piston.

The pneumatic spring bellows 2 is fastened at its upper end to the pneumatic spring cover 7 and is fastened at its other, lower end, so as to form a roll fold 8, to a pneumatic spring piston 9 which is connected to the damper cylinder 5 and on the outer side of which the pneumatic spring bellows can roll.

The pneumatic spring piston 9 is connected, at its top end and above the roll fold 8, to the damper cylinder 5 by means of an elastic bearing 10.

The elastic bearing 10 is composed of an elastomer body 11, in this case a rubber body, which is provided between an axially outwardly projecting collar 12, which is situated on the damper cylinder 5, and an axially inwardly projecting flange 13, which is arranged on the pneumatic spring piston 9.

The collar 12 situated on the damper cylinder is arranged below the piston-rod-side end 14 of the damper cylinder 5. The collar 12 situated on the damper cylinder 5 has been mounted on and subsequently welded to an encircling shoulder of the damper cylinder.

The elastomer body/rubber body 11 is formed as an annular hollow conical portion of relatively great thickness. The abutting flange and collar surfaces of the outwardly projecting collar 12 and of the inwardly projecting flange 13 are of a form complementary thereto and are vulcanized on.

Figure 2:
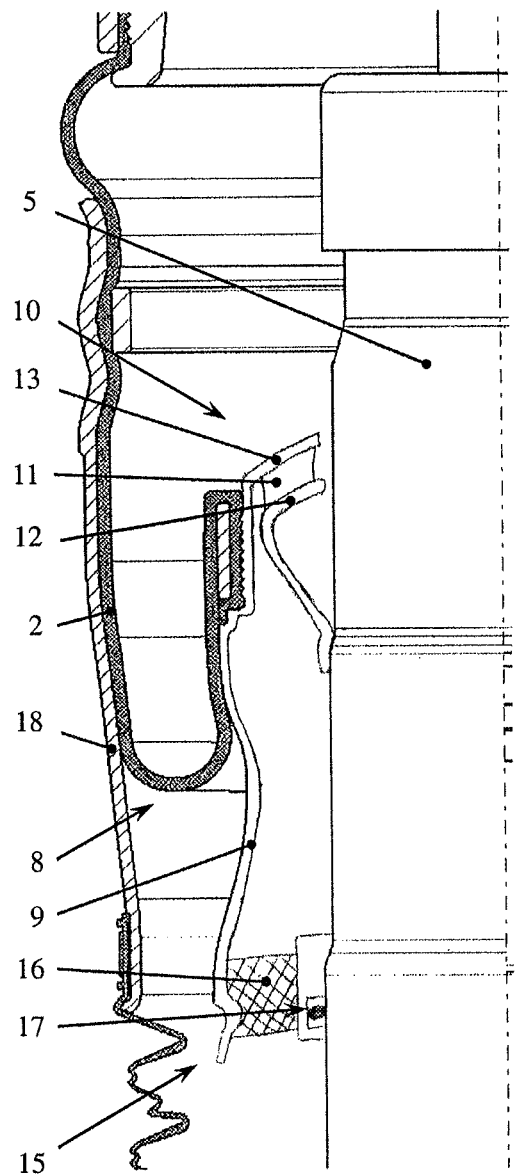
FIG. 2 shows a detail of a further embodiment of a pneumatic spring strut according to the invention for a passenger motor vehicle.

FIG. 2 shows a central detail, to the left of the central line, of another embodiment of a pneumatic spring strut according to the invention for a passenger motor vehicle, in which the pneumatic spring strut 9, at its lower end 15, is supported on the damper cylinder 5 by a further elastomer body 16 composed of rubber. In the region of the rubber body 16, a seal 17 is arranged on the lower end 15 of the pneumatic spring piston. Here, the pneumatic spring bellows 2 is supported by an outer guide 18.

LIST OF REFERENCE NUMERALS (Part of the description)
1 Pneumatic spring strut
2 Pneumatic spring bellows
3 Working chamber
4 Damper
5 Damper cylinder
6 Piston rod
7 Pneumatic spring cover
8 Roll fold
9 Pneumatic spring piston
10 Elastic bearing
11 Elastomer body/rubber body
12 Collar
13 Flange
14 Piston-rod-side end
15 Lower end of the pneumatic spring piston 9
16 Rubber body
17 Seal
18 Outer guide
side end of the damper cylinder.

The invention claimed is:

1. A pneumatic spring strut for a vehicle, having a working chamber which is at least partially enclosed by a pneumatic spring bellows composed of elastomeric material and having a telescopic damper which is arranged centrally and at least partially within the working chamber, said damper comprising a housing, which is formed as a damper cylinder and which has a damping piston situated at the inside, and comprising a piston rod which is connected to the damping piston, wherein the pneumatic spring bellows is fastened at one end thereof to the pneumatic spring cover and is fastened at the other end thereof, so as to form a roll fold, to a pneumatic spring piston connected to the damper cylinder and can roll on the outer side of said pneumatic spring piston, wherein i) the pneumatic spring piston is connected, at its top end and above the roll fold, to the damper cylinder by an elastic bearing, ii) the elastic bearing is composed of an elastomer body which is provided between a radially outwardly projecting collar, which is situated on the damper cylinder, and a radially inwardly projecting flange), which is arranged on the pneumatic spring piston, iii) the collar situated on the damper cylinder is arranged below the piston-rod-side end of the damper cylinder, and iv) an air gap is formed that extends from a side surface of the elastomer body toward a side surface of the damper cylinder.

2. The pneumatic spring strut as claimed in claim 1, wherein the collar situated on the damper cylinder is welded to or pressed in an air-tight manner onto the damper cylinder.

3. The pneumatic spring strut as claimed in claim 1, wherein the elastomer body is formed as a substantially annular hollow conical portion, and the abutting flange and collar surfaces are of a form complementary thereto.

4. The pneumatic spring strut as claimed in claim 1, wherein the elastomer body is composed of rubber.

5. The pneumatic spring strut as claimed in claim 1, wherein the elastomer body is connected to the flange and/or to the collar by vulcanization.

6. The pneumatic spring strut as claimed in claim 1, wherein the elastomer body is connected to the flange and/or to the collar by means of a positively locking tongue-and-groove connection.

7. The pneumatic spring strut as claimed in claim 1, wherein the pneumatic spring strut, at its lower end, is supported on the damper cylinder by a further elastomer body.

8. The pneumatic spring strut as claimed in claim 7, wherein a seal is arranged in the region of the further elastomer body at the lower end of the pneumatic spring piston.

9. The pneumatic spring strut as claimed in claim 1, wherein a seal is arranged in the region of a lower end of the pneumatic spring piston, between the pneumatic spring piston and the damper cylinder.

10. The pneumatic spring strut as claimed in claim 1, wherein the elastomer body arranged between the collar of the damper cylinder and the flange of the pneumatic spring piston is in the form of a segmented ring.

* * * * *